US012579681B2

(12) United States Patent
Shao

(10) Patent No.: US 12,579,681 B2
(45) Date of Patent: Mar. 17, 2026

(54) METHOD AND DEVICE FOR DRAWING SPATIAL MAP, CAMERA EQUIPMENT AND STORAGE MEDIUM

(71) Applicant: BEIJING XIAOMI MOBILE SOFTWARE CO., LTD., Beijing (CN)

(72) Inventor: Ziheng Shao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 332 days.

(21) Appl. No.: 18/328,517

(22) Filed: Jun. 2, 2023

(65) Prior Publication Data

US 2024/0212199 A1     Jun. 27, 2024

(30) Foreign Application Priority Data

Dec. 27, 2022    (CN) .......................... 202211680745.8

(51) Int. Cl.
*G06T 7/73*          (2017.01)
*G06T 7/50*          (2017.01)
*G06T 11/20*         (2006.01)

(52) U.S. Cl.
CPC .................. *G06T 7/73* (2017.01); *G06T 7/50* (2017.01); *G06T 11/206* (2013.01)

(58) Field of Classification Search
None
See application file for complete search history.

(56) References Cited

U.S. PATENT DOCUMENTS

| 2021/0304494 | A1* | 9/2021 | Yamamoto | ............. | G01B 11/00 |
| 2021/0334569 | A1* | 10/2021 | Fang | .................... | G06V 40/171 |
| 2023/0260151 | A1* | 8/2023 | Li | ......................... | G06V 10/457 |
| | | | | | 382/103 |

FOREIGN PATENT DOCUMENTS

CN          112085842 A     12/2020

OTHER PUBLICATIONS

Extended European Search Report issued Nov. 24, 2023 in European Patent Application No. 23179607.9, 9 pages.
(Continued)

*Primary Examiner* — James A Thompson
(74) *Attorney, Agent, or Firm* — Oblon, McClelland, Maier & Neustadt, L.L.P.

(57)          ABSTRACT
A method for drawing a spatial map that can include determining a depth value of a feature point in an image captured by camera equipment in a current position, the depth value being a depth value in a relative coordinate system established with the current position of the camera equipment as a coordinate origin, determining a relative position coordinate of the feature point in the relative coordinate system based on the depth value, determining a spatial position coordinate of the feature point in a spatial coordinate system based on the relative position coordinate, the spatial coordinate system being a spatial coordinate system established with a preset position of the camera equipment as a coordinate origin, and drawing the spatial map according to the spatial position coordinate of the feature point and a pixel value of the image captured by the camera equipment, based on the spatial coordinate system.

16 Claims, 8 Drawing Sheets

(56) References Cited

OTHER PUBLICATIONS

Klein et al., "Parallel Tracking and Mapping for Small AR Workspaces", $6^{th}$ IEEE and ACM International Symposium on Mixed and Augmented Reality, Nov. 13, 2007, pp. 1-10.

Hong Gao et al., "An improved Augmented Reality Registration Method Based on Visual SLAM", Edutainment 2017, LNCS vol. 10345, 2017, pp. 11-19.

Chinese Office Action dated Dec. 24, 2025, issued in Chinese Patent Application No. 202211680745.8 (with English translation).

* cited by examiner determine a depth value of a feature point in an image captured by the camera equipment in a current position, the depth value being a depth value in a relative coordinate system established with the current position of the camera equipment as a coordinate origin    S101 determine a relative position coordinate of the feature point in the relative coordinate system based on the depth value    S102 determine a spatial position coordinate of the feature point in a spatial coordinate system based on the relative position coordinate, the spatial coordinate system being a spatial coordinate system established with a preset position of the camera equipment as a coordinate origin    S103 draw the spatial map according to the spatial position coordinate of the feature point and a pixel value of the image captured by the camera equipment, based on the spatial coordinate system    S104

Fig. 1

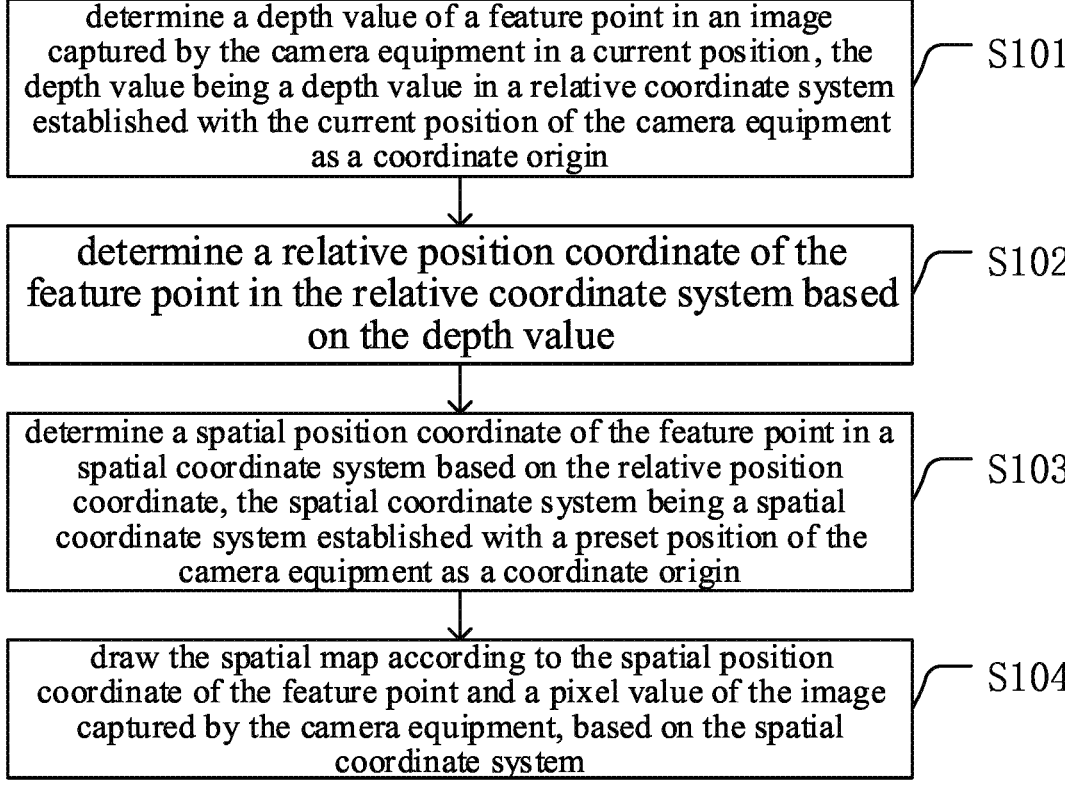

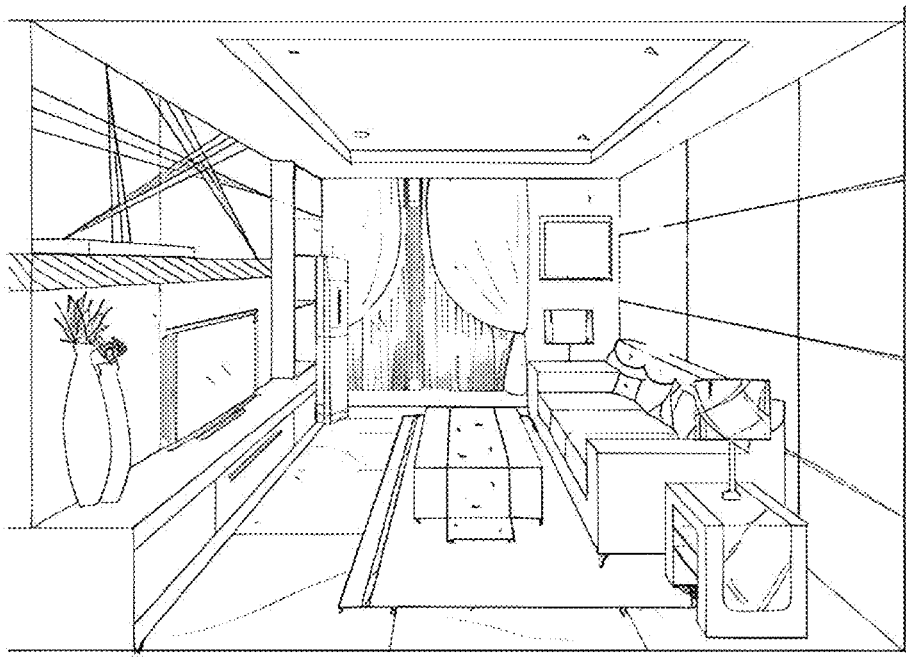

Fig. 2(a)

obtain the number of pixel points between the feature point and a pixel point corresponding to a projection center of the camera equipment, in the image                    S401 determine the relative position coordinate according to the number of pixel points and the depth value                    S402 obtain the spatial position coordinate of the current position of the camera equipment in the spatial coordinate system — S601 determine the spatial position coordinate of the feature point in the spatial coordinate system according to the spatial position coordinate of the current position of the camera equipment and the relative position coordinate of the feature point — S602

Fig. 6

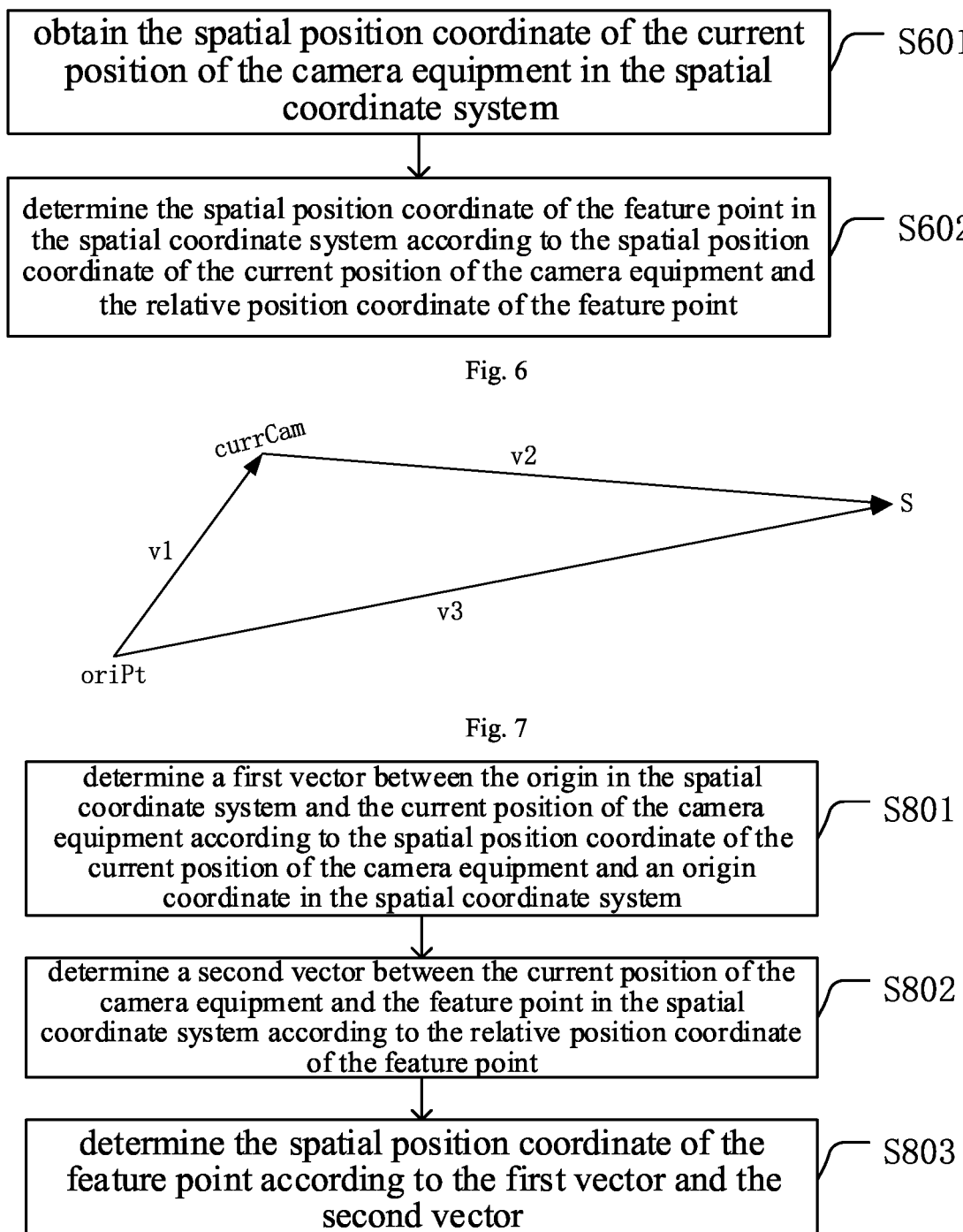

Fig. 7 determine a first vector between the origin in the spatial coordinate system and the current position of the camera equipment according to the spatial position coordinate of the current position of the camera equipment and an origin coordinate in the spatial coordinate system — S801 determine a second vector between the current position of the camera equipment and the feature point in the spatial coordinate system according to the relative position coordinate of the feature point — S802 determine the spatial position coordinate of the feature point according to the first vector and the second vector — S803

Fig. 8 determine a second transformation relationship between the relative position coordinate of the feature point and the second vector, according to a first transformation relationship between the spatial position coordinate of the current position of the camera equipment and the origin coordinate in the spatial coordinate system — S901 determine the second vector between the current position of the camera equipment and the feature point in the spatial coordinate system according to the second transformation relationship and the relative position coordinate — S902

Fig. 9 determine a third vector between the origin and the feature point in the spatial coordinate system according to a sum of the first vector and the second vector — S1001 determine the spatial position coordinate of the feature point according to the origin coordinate of the spatial coordinate system and the third vector — S1002

Fig. 10 obtain initial feature points within a preset area in an image — S1101 obtain a depth value of each initial feature point — S1102 determine the depth value of the feature point in the image according to the depth value of each initial feature point within the preset area — S1102

Fig. 11

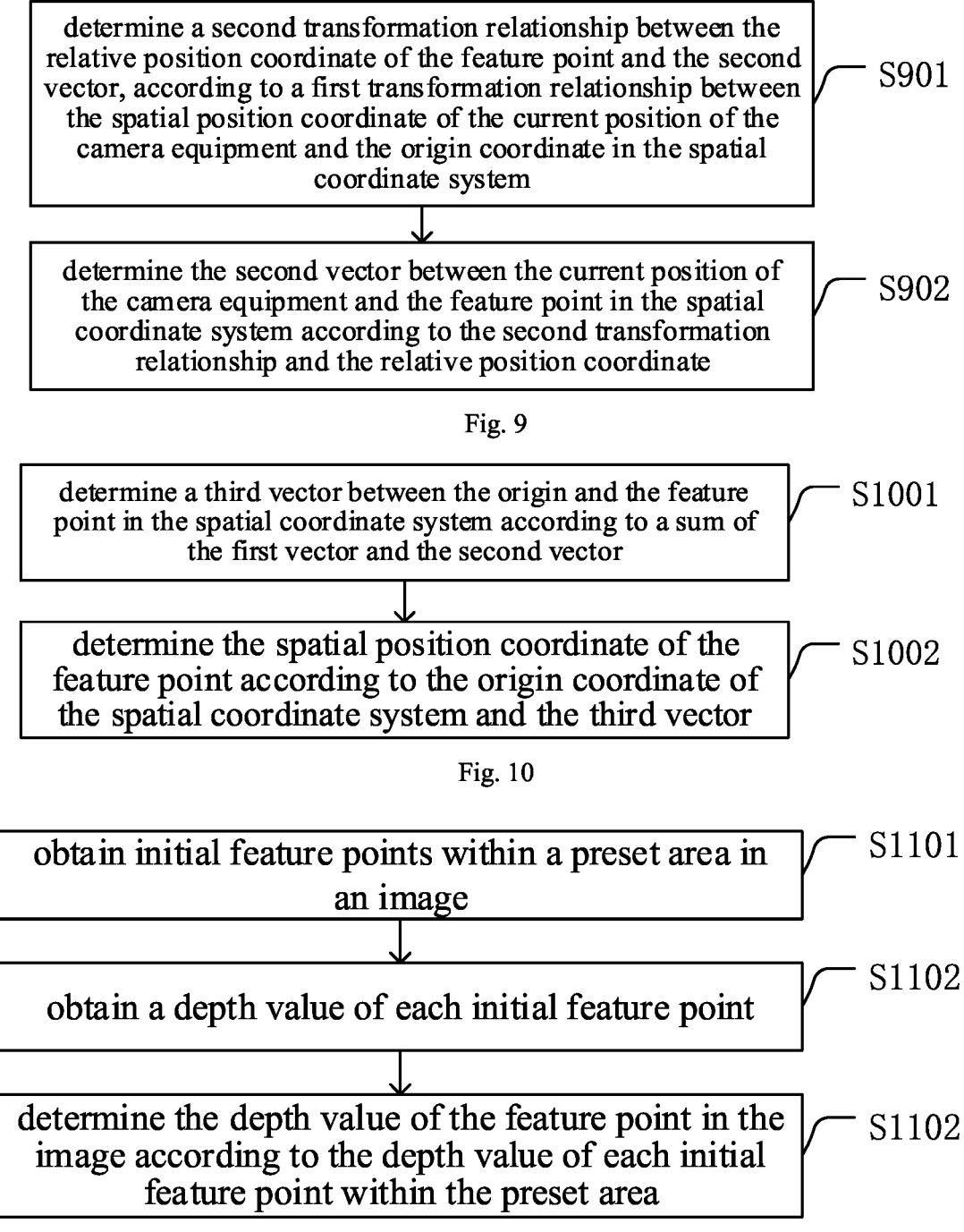

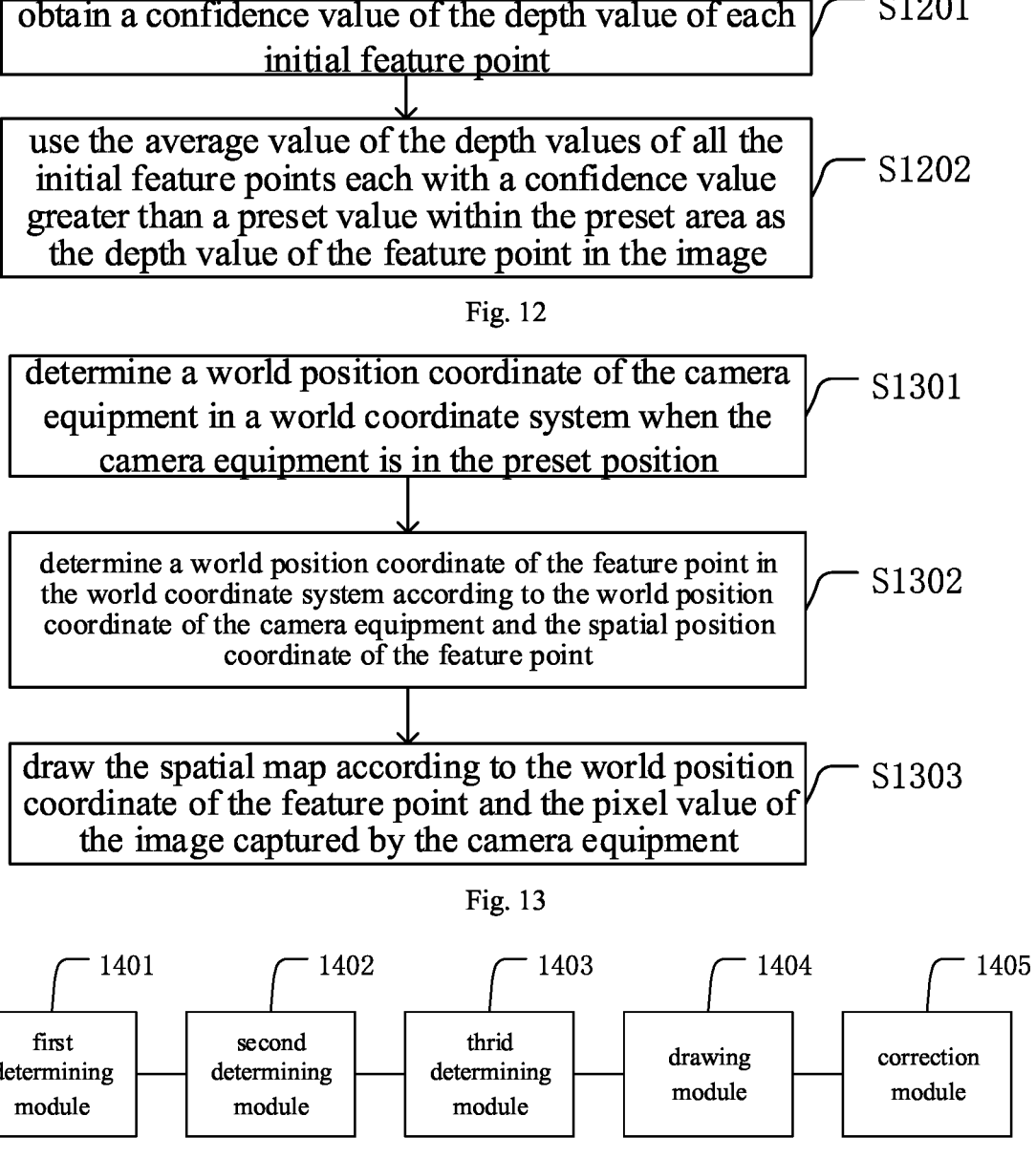

obtain a confidence value of the depth value of each initial feature point    S1201 use the average value of the depth values of all the initial feature points each with a confidence value greater than a preset value within the preset area as the depth value of the feature point in the image    S1202

Fig. 12 determine a world position coordinate of the camera equipment in a world coordinate system when the camera equipment is in the preset position    S1301 determine a world position coordinate of the feature point in the world coordinate system according to the world position coordinate of the camera equipment and the spatial position coordinate of the feature point    S1302 draw the spatial map according to the world position coordinate of the feature point and the pixel value of the image captured by the camera equipment    S1303

| first determining module | second determining module | thrid determining module | drawing module | correction module |

Fig. 14

METHOD AND DEVICE FOR DRAWING SPATIAL MAP, CAMERA EQUIPMENT AND STORAGE MEDIUM

CROSS-REFERENCE TO RELATED APPLICATION

This application is based on and claims priority to Chinese Patent Application No. 202211680745.8 filed on Dec. 27, 2022, the entire content of which is incorporated herein by reference for all purposes.

BACKGROUND

Field of Technology

Augmented Reality (AR) technology is intended to give users an immersive virtual scene experience based on a real space where the users are and in combination with virtual elements in electronic equipment, such as virtual ornaments, virtual space interactions, and interactions that extend into real space. During construction of associated virtual scenes, simultaneous localization and mapping (SLAM) technology is usually used for positioning of the electronic equipment itself in its environment, and an incremental map, called SLAM map, is built based on the positioning of the electronic equipment itself, to facilitate positioning of the electronic equipment itself and various elements in virtual scenes during subsequent moving processes.

SUMMARY

The present disclosure relates to the field of virtual scenes, and more particularly to a method for drawing a spatial map, as well as camera equipment and a storage medium.

According to a first aspect of the present disclosure, a method for drawing a spatial map is provided and is applied to camera equipment. The method can include determining a depth value of a feature point in an image captured by the camera equipment in a current position, the depth value being a depth value in a relative coordinate system established with the current position of the camera equipment as a coordinate origin, determining a relative position coordinate of the feature point in the relative coordinate system based on the depth value, determining a spatial position coordinate of the feature point in a spatial coordinate system based on the relative position coordinate, the spatial coordinate system being a spatial coordinate system established with a preset position of the camera equipment as a coordinate origin, and drawing the spatial map according to the spatial position coordinate of the feature point and a pixel value of the image captured by the camera equipment, based on the spatial coordinate system.

According to a second aspect of the present disclosure, camera equipment is provided and includes a processor and a memory configured to store an instruction executable by the processor. The processor is configured to determine a depth value of a feature point in an image captured by the camera equipment in a current position, the depth value being a depth value in a relative coordinate system established with the current position of the camera equipment as a coordinate origin, determine a relative position coordinate of the feature point in the relative coordinate system based on the depth value, determine a spatial position coordinate of the feature point in a spatial coordinate system based on the relative position coordinate, the spatial coordinate system being a spatial coordinate system established with a preset position of the camera equipment as a coordinate origin, and draw the spatial map according to the spatial position coordinate of the feature point and a pixel value of the image captured by the camera equipment, based on the spatial coordinate system.

According to a third aspect of the present disclosure, there is provided a non-transitory computer-readable storage medium having stored therein an instruction that, when executed by a processor of camera equipment, enables the camera equipment to perform a method for drawing a spatial map is provided and is applied to camera equipment. The method can include determining a depth value of a feature point in an image captured by the camera equipment in a current position, the depth value being a depth value in a relative coordinate system established with the current position of the camera equipment as a coordinate origin, determining a relative position coordinate of the feature point in the relative coordinate system based on the depth value, determining a spatial position coordinate of the feature point in a spatial coordinate system based on the relative position coordinate, the spatial coordinate system being a spatial coordinate system established with a preset position of the camera equipment as a coordinate origin, and drawing the spatial map according to the spatial position coordinate of the feature point and a pixel value of the image captured by the camera equipment, based on the spatial coordinate system.

BRIEF DESCRIPTION OF THE DRAWINGS

The accompanying drawings, which are incorporated in and constitute a part of this specification, illustrate exemplary embodiments consistent with the present disclosure and together with the description, serve to explain principles of the present disclosure.

FIG. 1 is a flowchart of a method for drawing a spatial map according to some embodiments;

FIGS. 2(a)-2(c) are schematic views illustrating addition of virtual elements into a scene according to some embodiments;

FIG. 6 is a flowchart of step S103 for determining a spatial position coordinate of the feature point in a spatial coordinate system based on the relative position coordinate according to some embodiments;

FIG. 7 is a schematic view showing the spatial position coordinate of the feature point according to some embodiments.

FIG. 8 is a flowchart of step S602 for determining the spatial position coordinate of the feature point in the spatial coordinate system according to a spatial position coordinate of a current position of camera equipment and the relative position coordinate of the feature point, according to some embodiments;

FIG. 9 is a flowchart of step S802 for determining a second vector between the current position of the camera equipment and the feature point in the spatial coordinate system according to the relative position coordinate of the feature point according to some embodiments;

FIG. 10 is a flowchart of step S803 for determining the spatial position coordinate of the feature point according to a first vector and the second vector according to some embodiments;

FIG. 11 is a flowchart of step S101 for determining a depth value of the feature point in an image captured by the camera equipment in the current position according to some embodiments;

FIG. 12 is a flowchart of step S1103 for determining the depth value of the feature point in the image according to a depth value of each initial feature point within a preset area according to some embodiments;

FIG. 13 is a flowchart of a method for drawing a spatial map according to some embodiments;

FIG. 14 is a block diagram of a device for drawing a spatial map according to some embodiments.

DETAILED DESCRIPTION OF THE PREFERRED EMBODIMENTS

Figure 2B:
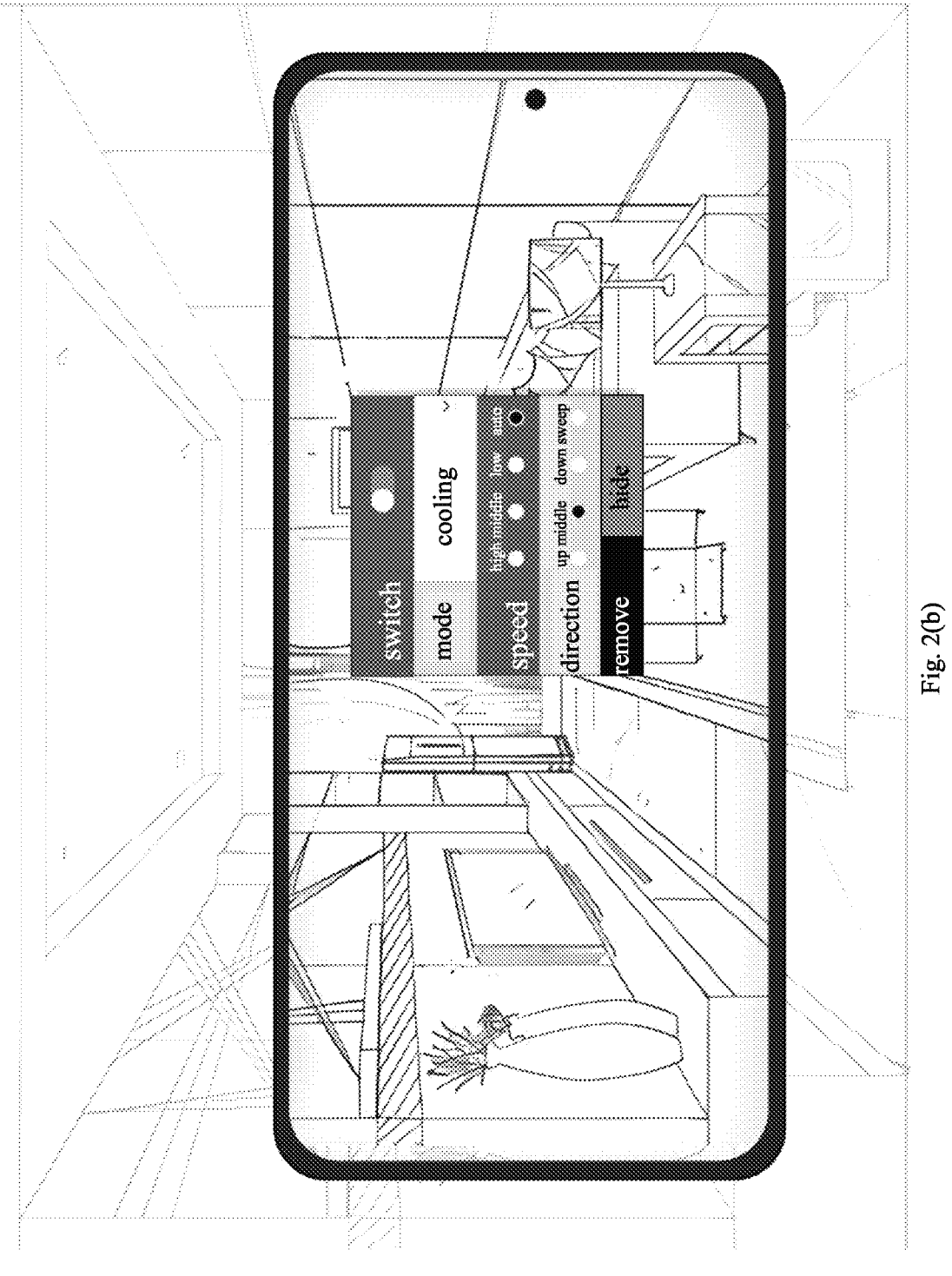

Exemplary embodiments of the present disclosure will be described in detail and examples thereof will be shown in drawings. In terms of the description involving the drawings, unless otherwise indicated, the same numbers in different drawings represent the same or similar elements. Implementations described in the following embodiments do not represent all implementations consistent with the present disclosure, and instead, they are merely examples of devices and methods consistent with some aspects of the present disclosure as detailed in the appended claims.

In the related art, SLAM maps are usually constructed with the help of hardware in the electronic equipment, in which the hardware can provide environmental information, such as Time of flight (ToF) cameras, multi-lens cameras, and laser radars. Therefore, calculation modules and software frameworks used in map construction are lack of versatility and costly.

In the related art, electronic equipment is provided with four RGB cameras and one ToF depth camera or provided with four black-and-white positioning and tracking cameras, to obtain spatial position information of each element in an environment of a virtual scene, for SLAM measurement. Both ToF depth cameras and black-and-white positioning and tracking cameras need sophisticated sensors, which are costly, and their corresponding software frameworks lack universality and cannot guarantee versatility across software platforms. In addition, the high-cost camera module with a plurality of cameras needs to be equipped with a processor with high computing power. Therefore, when the cost of the equipment is increased, it is also difficult to achieve miniaturization and lightweight of the equipment.

In some embodiments of the present disclosure, a method for drawing a spatial map is provided and is applied to camera equipment. FIG. 1 is a flowchart of a method for drawing a spatial map according to some embodiments. As shown in FIG. 1, the method can include the following steps: in step S101, determining a depth value of a feature point in an image captured by the camera equipment in a current position, the depth value being a depth value in a relative coordinate system established with the current position of the camera equipment as a coordinate origin; in step S102, determining a relative position coordinate of the feature point in the relative coordinate system based on the depth value; in step S103, determining a spatial position coordinate of the feature point in a spatial coordinate system based on the relative position coordinate, the spatial coordinate system being a spatial coordinate system established with a preset position of the camera equipment as a coordinate origin; and in step S104, drawing the spatial map according to the spatial position coordinate of the feature point and a pixel value of the image captured by the camera equipment, based on the spatial coordinate system.

In some embodiments of the present disclosure, the method for drawing the spatial map is provided. In the method, the depth value of the feature point in the image captured by the camera equipment in the current position is determined, the depth value being the depth value in the relative coordinate system established with the current position of the camera equipment as the coordinate origin; in the relative coordinate system, the relative position coordinate of the feature point is determined based on the depth value; the spatial position coordinate of the feature point in the spatial coordinate system is determined based on the relative position coordinate, the spatial coordinate system being the spatial coordinate system established with the preset position of the camera equipment as the coordinate origin; and based on the spatial coordinate system, the spatial map is drawn according to the spatial position coordinate of the feature point and the pixel value of the image captured by the camera equipment. In the method according to the present disclosure, the SLAM spatial map is drawn by determining the relative position coordinate of the feature point based on the depth value and by determining the spatial position coordinate of the feature point through a spatial transformation algorithm. As a result, the universality and versatility of the spatial map drawing method can be guaranteed, and users can enjoy a better virtual scene experience without any costly hardware structure.

The camera equipment includes electronic equipment with a camera and a display device, such as an AR/VR head-mounted display device, an AR/VR head-mounted all-in-one machine, and a terminal device. The camera equipment includes applications with virtual scene experience functions, such as virtual dressing in shopping software, and virtual furniture placement in interior design software. When a user activates a virtual scene function in an application, the camera equipment captures an image of a current real scene, draws a SLAM spatial map according to the position relationship of items in the current scene, and loads a virtual scene AR space according to the SLAM spatial map. When virtual elements are added to the current scene, for example, a virtual screen, a virtual ornament, a virtual intelligent assistant or a virtual controller of an Internet of Things (IoT) device in the current scene, position information of the virtual elements in the current scene are determined, and then various added virtual elements are loaded according to the determined position information. The user can interact with the various virtual elements, such as addition or deletion of the virtual elements, change in a placement position of the virtual ornament, or control over devices in the real scene by the virtual IoT controller.

Figure 2C:
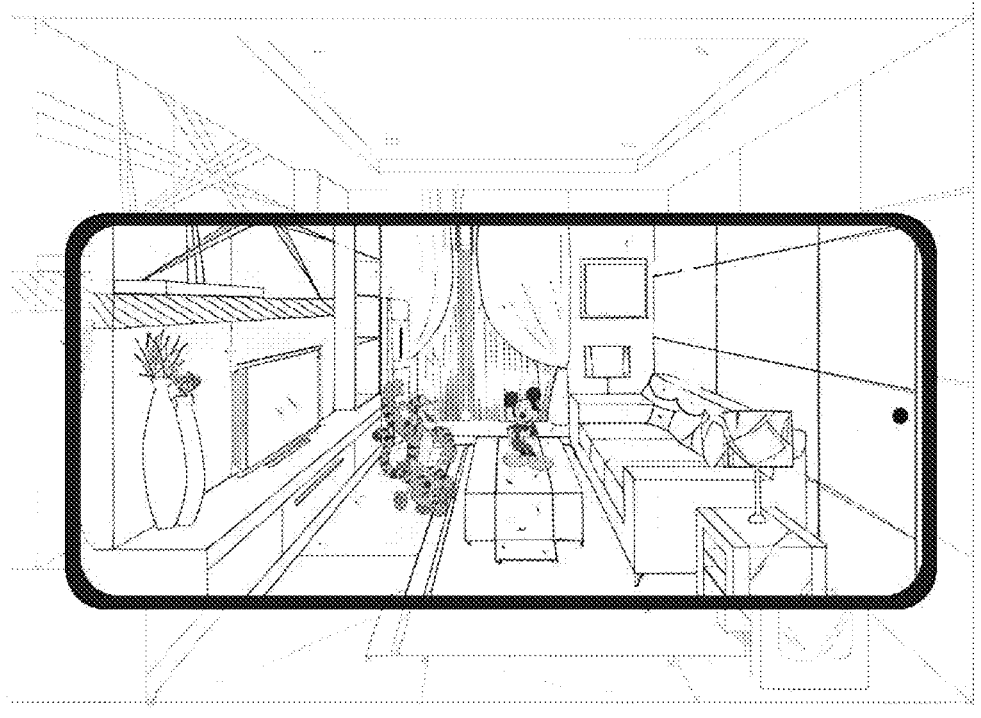
Figure 3A:
FIGS. 3(a)-3(b) are schematic views illustrating addition of virtual ornaments into a scene according to some embodiments.
Figures 3B, 4, 5:
FIG. 4 is a flowchart of step S102 for determining a relative position coordinate of a feature point in a relative coordinate system based on a depth value according to some embodiments.
FIG. 5 is a schematic view showing the relative position coordinate of the feature point according to some embodiments.

FIGS. 2(a)-2(c) are schematic views illustrating addition of virtual elements into a scene according to some embodiments. FIG. 2(a) represents a current scene in which virtual scene experience is desired, and the current scene is loaded on the display screen of the terminal device when the virtual scene experience is performed through the terminal device; FIG. 2(b) shows that a virtual controller for an air conditioner is added to the virtual scene, and a switch, mode, wind speed and the like of the air conditioner can be adjusted by the virtual controller; and FIG. 2(c) shows that a virtual animated character is added to the virtual scene. FIGS. 3(a)-3(b) are schematic views illustrating addition of virtual ornaments into a scene. FIG. 3(a) shows a user's TV cabinet as a placement scenario of virtual ornaments. When the virtual scene experience is performed through the terminal device, the current placement scenario is loaded on the display screen of the terminal device, and types of the virtual ornaments are displayed at the same time. After being selected, the virtual ornaments can be added to any position in the placement scenario according to personal wishes to view different placement effects of the virtual ornaments. As shown in FIG. 3(b), placement effects of televisions with different sizes on the TV cabinet can be observed.

In step S101, when drawing the SLAM spatial map, it is necessary to determine positions of various elements in the current scene, such as a position of the air conditioner in the current scene, capture the image of the current scene at the current position of the camera equipment, extract feature points from the image, and determine a position of each feature point, so as to determine the position of each element in the scene. During determining the position of the feature point, in the relative coordinate system established with the current position of the camera equipment as the coordinate origin, the depth value of the feature point relative to the camera equipment is first determined. The depth value of the feature point can be calculated by using a RGB camera of the camera equipment, as well as a gravity sensor, an acceleration sensor, a gyroscope and other measuring devices in the equipment; the displacement and attitude of the equipment in space is determined; and the depth value of each feature point is estimated based on a depth estimation algorithm for example as provided in ARCore, ARKit and other development kits.

In step S102, the relative coordinate system is a three-dimensional coordinate system, and the relative position coordinate of the feature point, that is, the relative position coordinate of the feature point relative to the camera equipment, is determined according to the depth value in the relative coordinate system established with the current position of the camera equipment as the coordinate origin. In the relative coordinate system, the depth value of the feature point is a value on a vertical axis Z of the relative position coordinate of the feature point, and a distance between the coordinate origin and the feature point is an abscissa and an ordinate of the relative position coordinate of the feature point.

In step S103, since a position or an angle of the camera equipment may change during the virtual scene experience, the position of the feature point in the current scene varies along with the change of the camera, that is, the relative position coordinate of the feature point changes. However, an absolute position of the feature point in space does not change, that is, the spatial position coordinate of the feature point in the spatial coordinate system does not change. For example, there is a feature point five meters away from the camera equipment; when the camera equipment moves close to the feature point, the relative position coordinate of the feature point relative to the camera equipment changes, and the feature point is three meters away from the camera equipment, but the spatial position of the feature point is not changed. Therefore, in order to ensure the stability of the picture, it is necessary to determine the position of the feature point in the current scene based on the spatial position coordinate of the feature point. The spatial coordinate system is established with the preset position of the camera equipment as the coordinate origin, and the preset position is a position where the camera equipment is when the camera equipment activates the virtual scene, or a position where the camera equipment is at the $k^{th}$ moment when the virtual scene is activated. In the established spatial coordinate system, the spatial position coordinate of each feature point is fixed. Since the position coordinate of the camera equipment in the spatial coordinate system can be determined according to the preset position, the spatial position coordinate of the feature point can be determined by transformation from the relative position coordinate of the feature point with respect to the camera equipment into the spatial position.

In step S104, after the spatial position coordinate of the feature point is determined, the pixel value of each feature point is determined according to the image of the scene captured by the RGB camera of the camera equipment, and the pixel value of each feature point is filled at the spatial position coordinate of each feature point. For example, a pixel value of a feature point with a position coordinate of (100,300,10) is 255, which means that the feature point is white. After the pixel values of all feature points are filled, the SLAM spatial map can be drawn and the virtual scene can be loaded.

In some embodiments of the present disclosure, the depth value of the feature point in the image captured by the camera equipment in the current position is determined in the relative coordinate system established with the current position of the camera equipment as the coordinate origin; the relative position coordinate of the feature point is determined according to the depth value; the spatial position coordinate of the feature point in the spatial coordinate system is determined according to the relative position coordinate, in which the spatial coordinate system is the spatial coordinate system established with the preset position of the camera equipment as the coordinate origin; and based on the spatial coordinate system, the spatial map is drawn according to the spatial position coordinate of the feature point and the pixel value of the image captured by the camera equipment. In the method according to the present disclosure, the SLAM spatial map is drawn by determining the relative position coordinate of the feature point based on the depth value and by determining the spatial position coordinate of the feature point through a spatial transformation algorithm. As a result, the universality and versatility of the spatial map drawing method can be guaranteed, and users can enjoy a better virtual scene experience without any costly hardware structure.

FIG. 4 is a flowchart of step S102 for determining a relative position coordinate of the feature point in the relative coordinate system based on the depth value according to some embodiments. As shown in FIG. 4, there are the following steps: in step S401, obtaining the number of pixel points between the feature point and a pixel point corresponding to a projection center of the camera equipment, in the image; and in step S402, determining the relative position coordinate according to the number of pixel points and the depth value.

When the camera equipment captures the image, the pixel point corresponding to the projection center of the camera equipment in the captured image is determined. The projection center of the camera equipment is an image formed by an optical axis of the ray equipment, and the optical axis of the camera equipment is perpendicular to the picture. With the pixel point corresponding to the projection center as an origin, a horizontal direction as an abscissa axis X and a vertical direction as an ordinate axis Y, a plane rectangular coordinate system is established in the captured image. In the relative coordinate system established with the current position of the camera as the coordinate origin, the horizontal direction is X axis, the vertical direction is Y axis, and a depth direction of the feature point is Z axis. In the plane rectangular coordinate system of the image, according to the number of pixel points between the pixel point where the feature point is located and the origin, the coordinate of the pixel point where the feature point is located in the plane rectangular coordinate system is determined. According to an abscissa of the coordinate of the pixel point where the feature point is located in the plane rectangular coordinate system, an abscissa of the relative position coordinate of the feature point is determined; and according to an ordinate of the coordinate of the pixel point where the feature point is located in the plane rectangular coordinate system, an ordinate of the relative position coordinate of the feature points is determined. The depth value of the feature point is a value on the vertical axis in the relative position coordinate of the feature point. The relative position coordinate of the feature point is composed of the values of the abscissa, the ordinate and the vertical axis.

In some embodiments, determining the relative position coordinate according to the number of pixel points and the depth values includes: calculating the relative position coordinate of the feature point by the following formula:

$$S\_C = n \times h \times \alpha / 1000,$$

in which S_C represents the relative position coordinate of the feature point, n represents the number of pixel points, h represents the depth value, and α represents a camera transformation coefficient.

An absolute value of the abscissa and an absolute value of the ordinate of the relative position coordinate of the feature point are calculated through the above formula:

$$S\_x = n\_x \times h \times \alpha / 1000$$

$$S\_y = n\_y \times h \times \alpha / 1000$$

in which S_x represents the absolute value of the abscissa of the relative position coordinate of the feature point; S_y represents the absolute value of the ordinate of the relative position coordinate of the feature point; n_x represents the number of pixel points in a direction of the abscissa axis and between the feature point and the pixel point corresponding to the projection center in the image; n_x represents the number of pixel points in a direction of the ordinate axis and between the feature point and the pixel point corresponding to the projection center in the image; h represents the depth value of the feature point; and α represents the camera transformation coefficient, which is determined according to an actual situation of the camera equipment, and for example is 2.381.

According to the position of the feature point in the image, and the absolute values of the abscissa and ordinate of the relative position coordinate of the feature point, the abscissa and ordinate of the relative position coordinate of the feature point is determined. The depth value of the feature point is used as a vertical axis coordinate of the relative position coordinate of the feature point, and the relative position coordinate of the feature point is composed of the abscissa, the ordinate and the vertical axis coordinate.

FIG. 5 is a schematic view of the relative position coordinate of the feature point according to some embodiments. As shown in FIG. 5, in a picture 500, a point P represents the projection center of the camera equipment; a connection line between the camera equipment and the point P, that is, the optical axis, is perpendicular to the picture 500; point S represents the feature point; and the relative coordinate system is established with the current position of the camera equipment as the origin, in which the horizontal direction is X axis, the vertical direction is Y axis, and Z axis is from the camera equipment to the point P. An image 501 is captured in the picture 500. In each of the picture 500 and the image 501, a plane rectangular coordinate system is established with the point P as an origin, in which the horizontal direction is X axis and the vertical direction is Y axis. It can be seen that the relationship between the coordinate system in the image 501 and the coordinate system in the picture 500 represents an imaging process of the camera equipment. In the image 501, according to the number of pixel points between the pixel point where the feature point S is located and the origin P, the coordinate of the feature point S is determined to be (n_x, n_y). Since the feature point S is in the first quadrant, both the abscissa and the ordinate are positive numbers, and the depth value of the feature point S is recorded as H. According to the above formula, the absolute value S_x of the abscissa and the absolute value S_y of the ordinate of the relative position coordinate of the feature point is calculated. Consequently, the relative position coordinate of the feature point S is (S_x, S_y,h).

It should be noted that the above-mentioned relative coordinate system is established when the camera equipment is a standard camera. When the camera of the camera equipment is a wide-angle camera such as a fisheye camera or is a telephoto camera, the angle between the X axis and the Y axis needs to be adjusted according to a visual field angle of the camera during establishment of the relative coordinate system.

FIG. 6 is a flowchart of step S103 for determining a spatial position coordinate of the feature point in a spatial coordinate system based on the relative position coordinate according to some embodiments. As shown in FIG. 6, there are the following steps: in step S601, obtaining the spatial position coordinate of the current position of the camera equipment in the spatial coordinate system; and in step S602, determining the spatial position coordinate of the feature point in the spatial coordinate system according to the spatial position coordinate of the current position of the camera equipment and the relative position coordinate of the feature point.

The spatial coordinate system is established with the preset position of the camera as the origin. During the virtual scene experience, the angle and position of the camera equipment may change, and the spatial position coordinate of the current position of the camera equipment in the spatial coordinate system is obtained. In a process of obtaining the current spatial position coordinate of the camera equipment, starting from the preset position of the camera equipment, a moving direction and a moving distance of movement to the current position are determined according to a sensor in the camera equipment, and the spatial position coordinate of the current position of the camera equipment in the spatial coordinate system is determined according to the moving direction and the moving distance. According to the spatial position coordinate of the current position of the camera equipment and the relative position coordinate of the feature point relative to the camera equipment, the spatial position coordinate of the feature point in the spatial coordinate system is determined.

FIG. 7 is a schematic view of a spatial position coordinate of a feature point according to some embodiments. As shown in FIG. 7, a point oriPt represents the preset position of the camera equipment, a point currCam represents the current position of the camera equipment, and a point S represents the feature point. According to the spatial position coordinate and the relative position coordinate (0,0,0) of the point currCam, a transformation relationship between the relative position coordinate and the spatial position coordinate can be determined. Thus, the spatial position coordinate of the feature point S can be determined according to the transformation relationship between the relative position coordinate and the spatial position coordinate and according to the relative position coordinate of the feature point S.

FIG. 8 is a flowchart of step S602 for determining the spatial position coordinate of the feature point in the spatial coordinate system according to the spatial position coordinate of the current position of the camera equipment and the relative position coordinate of the feature point, according to some embodiments. As shown in FIG. 8, there are the following steps: in step S801, determining a first vector between the origin in the spatial coordinate system and the current position of the camera equipment according to the spatial position coordinate of the current position of the camera equipment and an origin coordinate in the spatial coordinate system; in step S802, determining a second vector between the current position of the camera equipment and the feature point in the spatial coordinate system according to the relative position coordinate of the feature point; and in step S803, determining the spatial position coordinate of the feature point according to the first vector and the second vector.

According to the spatial position coordinate of the current position of the camera equipment and the origin coordinate in the spatial coordinate system, the first vector between the origin and the current position of the camera equipment in the spatial coordinate system is determined. As shown in FIG. 7, the spatial position coordinate of the current position point currCam of the camera equipment is marked as $(c\_x,c\_y,c\_z)$; the origin coordinate in the spatial coordinate system is $(0,0,0)$; and the first vector denoted as v1 is $(c\_x-0,c\_y-0,c\_z-0)$, i.e., $(c\_x,c\_y,c\_z)$. According to the relative position coordinate of the feature point, the second vector between the current position of the camera equipment and the feature points is determined in the spatial coordinate system. As shown in FIG. 7, the relative position coordinate of the feature point S is $(S\_x,S\_y,h)$, and the second vector between the feature point and the current position of the camera equipment in the spatial coordinate system, that is, a vector between the point S and the point currCam, is determined according to the relative position coordinate of the feature point S. According to the first vector and the second vector, the vector between the feature point and the origin in the spatial coordinate system can be determined, and hence the spatial position coordinate of the feature point is determined.

FIG. 9 is a flowchart of step S802 for determining the second vector between the current position of the camera equipment and the feature point in the spatial coordinate system according to the relative position coordinate of the feature point according to some embodiments. As shown in FIG. 9, there are the following steps: in step S901, determining a second transformation relationship between the relative position coordinate of the feature point and the second vector, according to a first transformation relationship between the spatial position coordinate of the current position of the camera equipment and the origin coordinate in the spatial coordinate system; and in step S902, determining the second vector between the current position of the camera equipment and the feature point in the spatial coordinate system according to the second transformation relationship and the relative position coordinate.

The origin in the spatial coordinate system is the preset position of the camera equipment, so the first transformation relationship between the spatial position coordinate of the current position of the camera equipment and the origin coordinate in the spatial coordinate system is the first transformation relationship between the spatial position coordinate of the current position of the camera equipment and the coordinate of the camera equipment at the preset position. The relative position coordinate of the feature point is relative to the current position of the camera equipment, and the spatial position coordinate of the feature point is relative to the origin of the spatial coordinate system, that is, relative to the preset position of the camera equipment. Therefore, the relative position coordinate and spatial position coordinate of the feature point represent a change in a reference point of the feature point. Since the current position of the camera equipment is the origin in the relative coordinate system, the relative position coordinate of the feature point can represent the relationship between the current position of the camera equipment and the feature point in the relative coordinate system, which is equivalent to the second vector in the relative coordinate system. The first transformation relationship can reflect the transformation relationship between the spatial position coordinate of the current position of the camera equipment and the spatial position coordinate of the preset position, and the second vector is the relationship between the current position of the camera equipment and the feature point in the spatial coordinate system. Therefore, according to the first transformation relationship, the second transformation relationship between the relative position coordinate of the feature point and the second vector can be determined, which is equivalent to the second transformation relationship between the second vector in the relative coordinate system and the second vector in the spatial coordinate system. According to the second transformation relationship and the relative position coordinate of the feature point, the second vector between the current position of the camera equipment and the feature points in the spatial coordinate system can be determined.

A coordinate axis whose value is not changed during the movement of the camera equipment is identified and used as a fixed axis. For example, when the camera equipment does not change its vertical height during the movement, the Y axis in the spatial coordinate system is used as the fixed axis, and a rotation angle of the camera equipment from the preset position to the current position around the Y axis is calculated, which is the first transformation relationship between the spatial position coordinate of the current position of the camera equipment and the origin coordinate in the spatial coordinate system. The first transformation relationship can be calculated by Unity engine that is a 3D content creation platform and widely used as a development tool for virtual scene creation. A radian of the camera equipment rotating around the Y axis from the preset position to the current position is calculated by the a tan function in the Unity engine, which is a radian of the camera equipment rotating around the Y axis from the origin coordinate to the spatial position coordinate of the current position of the camera equipment in the spatial coordinate system:

$$L=a \tan(\text{currCam.forward}.x/\text{currCam.forward}.z),$$

in which L represents the rotation radian; currCam.forward.x represents the abscissa of the spatial position coordinate of the current position of the camera equipment; and currCam.forward.z represents the vertical axis coordinate of the spatial position coordinate of the current position of the camera equipment. After the rotation radian is determined, the rotation angle $\beta$ is determined according to a formula $\beta = L \times 180/\pi$.

After the first transformation relationship between the spatial position coordinate of the current position of the camera equipment and the origin coordinate in the spatial coordinate system is determined, a reverse direction of the first transformation relationship is the second transformation relationship. For example, if the first transformation relationship is that the rotation angle from the origin coordinate to the spatial position coordinate of the current position of the camera equipment around the Y axis in the spatial coordinate system is $\beta$, the second transformation relationship is that the second vector rotates around the Y axis by the rotation angle $\beta$ to obtain the relative position coordinate of the feature point. Therefore, according to the second transformation relationship and the second vector, when the second vector is determined, it is necessary to rotate the relative position coordinate of the feature point in the reverse direction around the Y axis by the rotation angle $\beta$, that is, the rotation angle is $-\beta$. When the relative position coordinate of the feature point is rotated by $-\beta$ angle around the Y axis through the Unity engine, the second vector v2 is expressed as: v2=Quaternion.AngleAxis ([$-\beta$], yAxis)×relative position coordinate of the feature point, in which Quaternion.AngleAxis is a 3D rotation algorithm in the Unity engine and yAxis represents rotation around the Y axis.

FIG. 10 is a flowchart of step S803 for determining the spatial position coordinate of the feature point according to the first vector and the second vector according to some embodiments. As shown in FIG. 10, there are the following steps: in step S1001, determining a third vector between the origin and the feature point in the spatial coordinate system according to a sum of the first vector and the second vector; and in step S1002, determining the spatial position coordinate of the feature point according to the origin coordinate of the spatial coordinate system and the third vector.

The first vector is denoted as v1 and the second vector is denote as v2. Since the first vector is between the origin and the current position of the camera equipment in the spatial coordinate system, and the second vector is between the feature point and the current position of the camera equipment in the spatial coordinate system, as shown in FIG. 7, the sum of the first vector and the second vector is the third vector between the feature point in the spatial coordinate system and the origin of the spatial coordinate system. The origin coordinate of the spatial coordinate system is (0,0,0), so the third vector is the spatial position coordinate of the feature point. For example, the first vector is (c_x,c_y,c_z); the second vector is (t_x,t_y,t_z); the third vector is (c_x+t_x,c_y+t_y,c_z+t_z); and the origin coordinate of the spatial coordinate system is (0,0,0), so that the spatial position coordinate of the feature point is (c_x+t_x+0,c_y+t_y+0, c_z+t_z+0), i.e., (c_x+t_x,c_y+t_y,c_z+t_z).

FIG. 11 is a flowchart of step S101 for determining the depth value of the feature point in the image captured by the camera equipment in the current position according to some embodiments. As shown in FIG. 11, there are the following steps: in step S1101, obtaining initial feature points within a preset area in an image; in step S1102, obtaining a depth value of each initial feature point; and in step S1103, determining the depth value of the feature point in the image according to the depth value of each initial feature point within the preset area.

The preset area is an area with a preset size, which is determined according to actual demands. All the feature points extracted from the image captured by the camera equipment are initial feature points, and the depth value of each initial feature point is obtained, for example, by ARCore development kit. In order to improve the accuracy of depth values and reduce the calculation workload of spatial position coordinates of the feature points, all the initial feature points within the preset area are recorded as one feature point, that is, the feature point in the image. The depth value of the feature point in the image is determined according to the depth value of each initial feature point within the preset area. For example, an average value or a median value of statistical values of the depth values of all the initial feature points within the preset area is used as the depth value of the feature point in the image.

For example, if the number of initial feature points extracted from the image is 160×90, spatial position coordinates of 14,400 feature points need to be calculated, and there may be initial feature points with low accuracy in depth values among the obtained initial feature points. Therefore, a preset area of 5×5 in the image is used as one feature point, a depth value of each preset area, that is, the depth value of the feature point in the image, is determined according to the depth value of each initial feature point within each preset area. In this way, the accuracy of the depth values can be ensured and the calculation workload can be reduced due to a decrease in the number of feature points to 32×18.

FIG. 12 is a flowchart of step S1103 for determining the depth value of the feature point in the image according to the depth value of each initial feature point within the preset area according to some embodiments. As shown in FIG. 12, there are the following steps: in step S1201, obtaining a confidence value of the depth value of each initial feature point; and in step S1202, using the average value of the depth values of all the initial feature points each with a confidence value greater than a preset value within the preset area as the depth value of the feature point in the image.

When the depth value of the initial feature point is obtained by ARCore development kit, the confidence value of the depth value of the initial feature point is also obtained. The confidence value indicates a confidence degree of the depth value calculated by the program itself, and the confidence value ranges from 0 to 255. The larger the value is, the more confident it is and the higher the accuracy of the depth value is. In order to improve the accuracy of the depth value, when a confidence value of an initial feature point at the center of the image is greater than a preset threshold, the depth value of each initial feature point in the image is obtained, in which the preset threshold is determined according to actual demands and is 200, for example. After the depth value of each initial feature point and the confidence value of the depth value are obtained, the average value of the depth values of all the initial feature points each with the confidence value greater than the preset value within the preset area is used as the depth value of the feature point in the image, in which the preset value is determined according to actual demands, usually greater than the preset threshold value, and is for example 240. The average value of the depth values of all the initial feature points with the confidence value of greater than 240 within the preset area is calculated and used as the depth value of the preset area, that is, the depth value of the feature point in the image. Since the average value of the depth values of all the initial feature points each with the confidence value greater than the preset value within the preset area is used as the depth value of the feature point in the image, the accuracy of depth value sampling can be ensured and the accuracy of the depth values of the feature point in the image can be enhanced.

In some embodiments, the preset position is a position where the camera equipment is when being started. FIG. 13 is a flowchart of a method for drawing a spatial map according to some embodiments. As shown in FIG. 13, there are the following steps: in step S1301, determining a world position coordinate of the camera equipment in a world coordinate system when the camera equipment is in the preset position; in step S1302, determining a world position coordinate of the feature point in the world coordinate system according to the world position coordinate of the camera equipment and the spatial position coordinate of the feature point; and in step S1303, drawing the spatial map according to the world position coordinate of the feature point and the pixel value of the image captured by the camera equipment.

When a virtual scene is built by the ARCore development kit, it is necessary to start the Unity engine before starting the ARCore development kit, and couple the engine to the camera equipment. The Unity engine calls sensor data related to location information of the Android operating system to obtain a world location coordinate of the preset position of the camera equipment in the world coordinate system. Using the same method as in step S602, which determines the spatial position coordinate of the feature point in the spatial coordinate system according to the spatial position coordinate of the current position of the camera equipment and the relative position coordinate of the feature point, the spatial position coordinate of the current position of the camera equipment in step S602 is replaced with the world position coordinate of the camera equipment, and the relative position coordinate of the feature point is replaced by the spatial position coordinate of the feature point. Therefore, the world position coordinate of the feature point in the world coordinate system can be determined, and the pixel value of the feature point in the image captured by the camera equipment is filled in the position corresponding to the world position coordinate of the feature point, to complete the drawing of the SLAM spatial map. Drawing the SLAM spatial map through the world coordinate system can facilitate expansion of the SLAM spatial map.

In some embodiments of the present disclosure, a device for drawing a spatial map is provided and applied to camera equipment. FIG. 14 is a block diagram of a device for drawing a spatial map according to some embodiments. As shown in FIG. 14, the device includes: a first determining module 1401, configured to determine a depth value of a feature point in an image captured by the camera equipment in a current position, in which the depth value is a depth value in a relative coordinate system established with the current position of the camera equipment as a coordinate origin; a second determining module 1402, configured to determine a relative position coordinate of the feature point in the relative coordinate system based on the depth value; a third determining module 1403, configured to determine a spatial position coordinate of the feature point in a spatial coordinate system based on the relative position coordinate, the spatial coordinate system being a spatial coordinate system established with a preset position of the camera equipment as a coordinate origin; and a drawing module 1404, configured to draw the spatial map according to the spatial position coordinate of the feature point and a pixel value of the image captured by the camera equipment, based on the spatial coordinate system.

In some embodiments, the second determining module 1402 is further configured to: obtain the number of pixel points between the feature point and a pixel point corresponding to a projection center of the camera equipment, in the image; and determine the relative position coordinate according to the number of pixel points and the depth value.

In some embodiments, the second determining module 1402 is further configured to: calculate the relative position coordinate by the following formula:

$$S\_C = n \times h \times \alpha / 1000$$

in which S_C represents the relative position coordinate, n represents the number of pixel points, h represents the depth value, and α represents a camera transformation coefficient.

In some embodiments, the third determining module 1403 is further configured to: obtain the spatial position coordinate of the current position of the camera equipment in the spatial coordinate system; and determine the spatial position coordinate of the feature point in the spatial coordinate system according to the spatial position coordinate of the current position of the camera equipment and the relative position coordinate of the feature point.

In some embodiments, the third determining module 1403 is further configured to: determine a first vector between the origin in the spatial coordinate system and the current position of the camera equipment according to the spatial position coordinate of the current position of the camera equipment and an origin coordinate in the spatial coordinate system; determine a second vector between the current position of the camera equipment and the feature point in the spatial coordinate system according to the relative position coordinate of the feature point; and determine the spatial position coordinate of the feature point according to the first vector and the second vector.

In some embodiments, the third determining module 1403 is further configured to: determine a second transformation relationship between the relative position coordinate of the feature point and the second vector, according to a first transformation relationship between the spatial position coordinate of the current position of the camera equipment and the origin coordinate in the spatial coordinate system; and determine the second vector between the current position of the camera equipment and the feature point in the spatial coordinate system according to the second transformation relationship and the relative position coordinate.

In some embodiments, the third determining module 1403 is further configured to: determine a third vector between the origin and the feature point in the spatial coordinate system according to a sum of the first vector and the second vector; and determine the spatial position coordinate of the feature point according to the origin coordinate of the spatial coordinate system and the third vector.

In some embodiments, the first determining module 1401 is further configured to: obtain initial feature points within a preset area in an image; obtain a depth value of each initial feature point; and determine the depth value of the feature point in the image according to the depth value of each initial feature point within the preset area.

In some embodiments, the first determining module 1401 is further configured to: obtain a confidence value of the depth value of each initial feature point; and use an average value of the depth values of all the initial feature points each with a confidence value greater than a preset value within the preset area as the depth value of the feature point in the image.

In some embodiments, the preset position is a position where the camera equipment is when being started.

In some embodiments, the device further includes a correction module 1405 configured to: determine a world position coordinate of the camera equipment in a world coordinate system when the camera equipment is in the preset position; determine a world position coordinate of the feature point in the world coordinate system according to the world position coordinate of the camera equipment and the spatial position coordinate of the feature point; and draw the spatial map according to the world position coordinate of the feature point and the pixel value of the image captured by the camera equipment.

With regard to the device in the above embodiments, the specific way in which each module performs operations has been described in detail in the embodiments related to the method, and will not be described in detail here.

Figure 15:
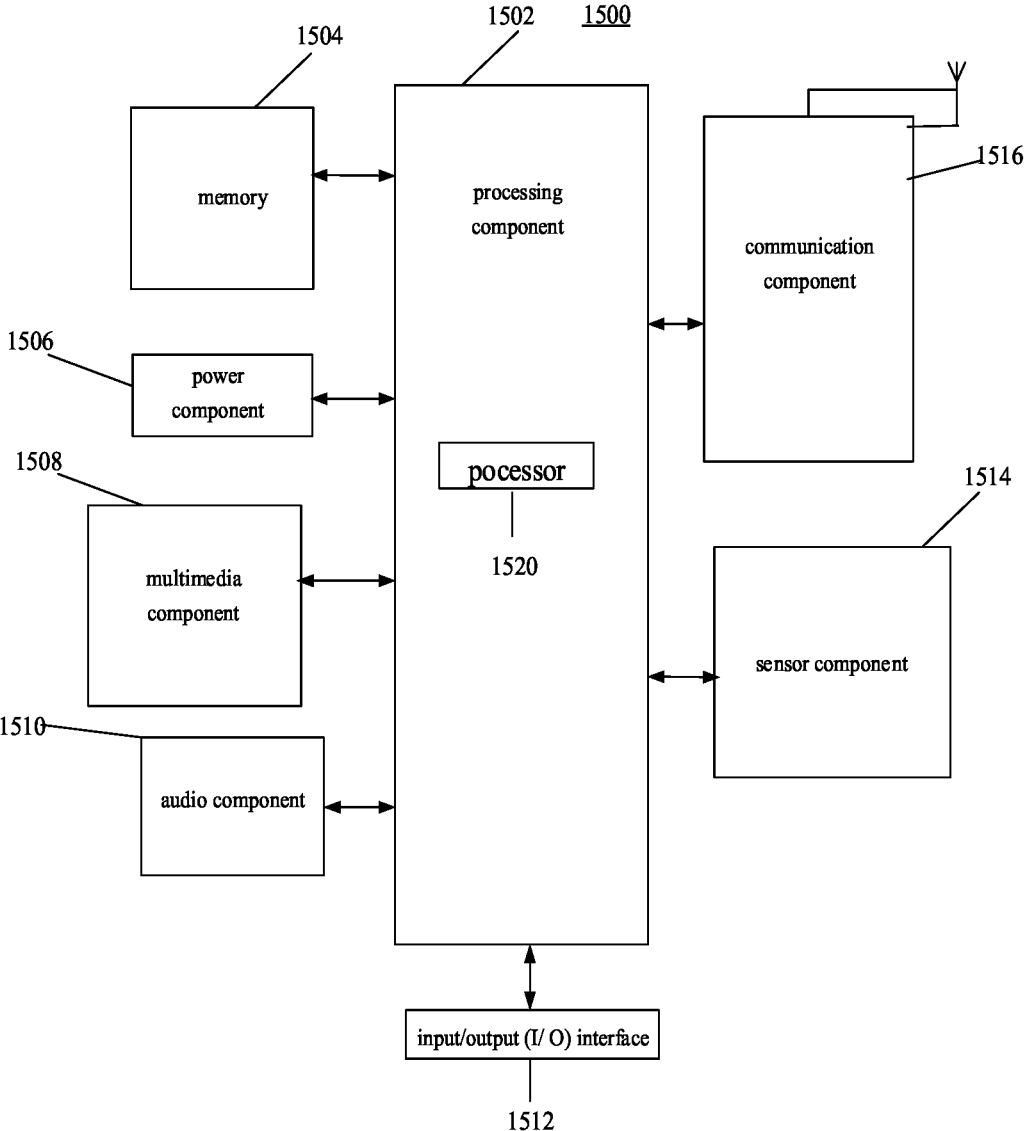
FIG. 15 is a block diagram of camera equipment for executing the method for drawing the spatial map according to some embodiments.

FIG. 15 is a block diagram of camera equipment 1500 configured to perform a method for drawing a spatial map according to some embodiments.

Referring to FIG. 15, the camera equipment 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the camera equipment 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between processing component 1502 and other components. For instance, the processing component 1502 may include a multimedia module to facilitate the interaction between the multimedia component 1508 and the processing component 1502.

The memory 1504 is configured to store various types of data to support the operation of the camera equipment 1500. Examples of such data include instructions for any applications or methods operated on the camera equipment 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1506 provides power to various components of the camera equipment 1500. The power component 1506 may include a power management system, one or more power sources, and any other components associated with the generation, management, and distribution of power in the camera equipment 1500.

The multimedia component 1508 includes a screen providing an output interface between the camera equipment 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the camera equipment 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the camera equipment 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a security keyboard, a click wheel, buttons, and the like. The buttons may include, but are not limited to, a home button, a volume button, a starting button, and a locking button.

The sensor component 1514 includes one or more sensors to provide status assessments of various aspects of the camera equipment 1500. For instance, the sensor component 1514 may detect an open/closed status of the camera equipment 1500, relative positioning of components, e.g., the display and the security keypad, of the camera equipment 1500, a change in position of the camera equipment 1500 or a component of the camera equipment 1500, a presence or absence of user contact with the camera equipment 1500, an orientation or an acceleration/deceleration of the camera equipment 1500, and a change in temperature of the camera equipment 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the camera equipment 1500 and other devices. The camera equipment 1500 can access a wireless network based on any communication standard, such as Wi-Fi, 2G, 3G, 4G, 5G or a combination thereof. In an embodiment, the communication component 1516 receives a broadcast signal or broadcast associated information from an external broadcast management system via a broadcast channel. In an embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the camera equipment 1500 may be implemented with one or more application specific integrated circuits (ASICs), digital signal processors (DSPs), digital signal processing devices (DSPDs), programmable logic devices (PLDs), field programmable gate arrays (FP-GAs), controllers, micro-controllers, microprocessors, or other electronic components, for performing the above described methods.

In some embodiments, there is also provided a non-transitory computer-readable storage medium including instructions, such as included in the memory 1504, executable by the processor 1520 in the camera equipment 1500, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium, when instructions in the storage medium are executed by a processor of camera equipment, enables the camera equipment to execute a method for drawing a spatial map, which includes any one of the above methods.

Other embodiments of the invention will be apparent to those skilled in the art from consideration of the specification and practice of the invention disclosed here. This application is intended to cover any variations, uses, or adaptations of the present invention following the general principles thereof and including such departures from the present invention as come within known or customary practice in the art.

It will be appreciated that the present invention is not limited to the exact construction that has been described above and illustrated in the accompanying drawings, and that various modifications and changes can be made without departing from the scope thereof. It is intended that the scope of the present invention only be limited by the appended claims.

The invention claimed is:

1. A method for drawing a spatial map, the method being applied to camera equipment and comprising:

determining a depth value of a feature point in an image captured by the camera equipment in a current position, the depth value being a depth value in a relative coordinate system established with the current position of the camera equipment as a coordinate origin;

determining a relative position coordinate of the feature point in the relative coordinate system based on the depth value;

determining a spatial position coordinate of the feature point in a spatial coordinate system based on the relative position coordinate, the spatial coordinate system being a spatial coordinate system established with a preset position of the camera equipment as a coordinate origin; and drawing the spatial map according to the spatial position coordinate of the feature point and a pixel value of the image captured by the camera equipment, based on the spatial coordinate system, wherein determining the spatial position coordinate of the feature point in the spatial coordinate system based on the relative position coordinate comprising:

obtaining the spatial position coordinate of the current position of the camera equipment in the spatial coordinate system; and determining the spatial position coordinate of the feature point in the spatial coordinate system according to the spatial position coordinate of the current position of the camera equipment and the relative position coordinate of the feature point; and wherein determining the spatial position coordinate of the feature point in the spatial coordinate system according to the spatial position coordinate of the current position of the camera equipment and the relative position coordinate of the feature point comprising:

determining a first vector between the origin in the spatial coordinate system and the current position of the camera equipment according to the spatial position coordinate of the current position of the camera equipment and an origin coordinate in the spatial coordinate system:

determining a second vector between the current position of the camera equipment and the feature point in the spatial coordinate system according to the relative position coordinate of the feature point; and determining the spatial position coordinate of the feature point according to the first vector and the second vector.

2. The method according to claim 1, wherein determining the relative position coordinate of the feature point in the relative coordinate system based on the depth value comprising:

obtaining the number of pixel points between the feature point and a pixel point corresponding to a projection center of the camera equipment, in the image; and determining the relative position coordinate according to the number of pixel points and the depth value.

3. The method according to claim 2, wherein determining the relative position coordinate according to the number of pixel points and the depth values comprising:

calculating the relative position coordinate of the feature point by a formula:

$$S\_C = n \times h \times \alpha / 1000,$$

wherein S_C represents the relative position coordinate of the feature point, n represents the number of pixel points, h represents the depth value, and a represents a camera transformation coefficient.

4. The method according to claim 1, wherein determining the second vector between the current position of the camera equipment and the feature point in the spatial coordinate system according to the relative position coordinate of the feature point comprising:

determining a second transformation relationship between the relative position coordinate of the feature point and the second vector, according to a first transformation relationship between the spatial position coordinate of the current position of the camera equipment and the origin coordinate in the spatial coordinate system; and determining the second vector between the current position of the camera equipment and the feature point in the spatial coordinate system according to the second transformation relationship and the relative position coordinate.

5. The method according to claim 4, wherein determining the spatial position coordinate of the feature point according to the first vector and the second vector comprising:

determining a third vector between the origin and the feature point in the spatial coordinate system according to a sum of the first vector and the second vector; and determining the spatial position coordinate of the feature point according to the origin coordinate of the spatial coordinate system and the third vector.

6. The method according to claim 1, wherein determining the depth value of the feature point in the image captured by the camera equipment in the current position comprising:

obtaining initial feature points within a preset area in an image;

obtaining a depth value of each initial feature point; and determining the depth value of the feature point in the image according to the depth value of each initial feature point within the preset area.

7. The method according to claim 6, wherein determining the depth value of the feature point in the image according to the depth value of each initial feature point within the preset area comprising:

obtaining a confidence value of the depth value of each initial feature point; and using the average value of the depth values of all the initial feature points each with a confidence value greater than a preset value within the preset area as the depth value of the feature point in the image.

8. The method according to claim 1, wherein the preset position is a position where the camera equipment is when being started.

9. The method according to claim 8, further comprising:

determining a world position coordinate of the camera equipment in a world coordinate system when the camera equipment is in the preset position;

determining a world position coordinate of the feature point in the world coordinate system according to the world position coordinate of the camera equipment and the spatial position coordinate of the feature point; and drawing the spatial map according to the world position coordinate of the feature point and the pixel value of the image captured by the camera equipment.

10. Camera equipment comprising:

a processor; and a memory configured to store an instruction executable by the processor;

wherein the processor is configured to:

determine a depth value of a feature point in an image captured by the camera equipment in a current position, the depth value being a depth value in a relative coordinate system established with the current position of the camera equipment as a coordinate origin;

determine a relative position coordinate of the feature point in the relative coordinate system based on the depth value;

determine a spatial position coordinate of the feature point in a spatial coordinate system based on the relative position coordinate, the spatial coordinate system being a spatial coordinate system established with a preset position of the camera equipment as a coordinate origin; and draw the spatial map according to the spatial position coordinate of the feature point and a pixel value of the image captured by the camera equipment, based on the spatial coordinate system, wherein the processor is configured to:

obtain the spatial position coordinate of the current position of the camera equipment in the spatial coordinate system; and determine the spatial position coordinate of the feature point in the spatial coordinate system according to the spatial position coordinate of the current position of the camera equipment and the relative position coordinate of the feature point;

wherein the processor is configured to:

determine a first vector between the origin in the spatial coordinate system and the current position of the camera equipment according to the spatial position coordinate of the current position of the camera equipment and an origin coordinate in the spatial coordinate system;

determine a second vector between the current position of the camera equipment and the feature point in the spatial coordinate system according to the relative position coordinate of the feature point: and determine the spatial position coordinate of the feature point according to the first vector and the second vector.

11. The camera equipment according to claim 10, wherein the processor is configured to:

obtain the number of pixel points between the feature point and a pixel point corresponding to a projection center of the camera equipment, in the image; and determine the relative position coordinate according to the number of pixel points and the depth value.

12. The camera equipment according to claim 11, wherein the processor is configured to:

calculate the relative position coordinate of the feature point by a formula:

$$S\_C = n \times h \times \alpha / 1000,$$

wherein S_C represents the relative position coordinate of the feature point, n represents the number of pixel points, h represents the depth value, and o represents a camera transformation coefficient.

13. The camera equipment according to claim 10, wherein the processor is configured to:

determine a second transformation relationship between the relative position coordinate of the feature point and the second vector, according to a first transformation relationship between the spatial position coordinate of the current position of the camera equipment and the origin coordinate in the spatial coordinate system; and determine the second vector between the current position of the camera equipment and the feature point in the spatial coordinate system according to the second transformation relationship and the relative position coordinate.

14. The camera equipment according to claim 13, wherein the processor is configured to:

determine a third vector between the origin and the feature point in the spatial coordinate system according to a sum of the first vector and the second vector; and determine the spatial position coordinate of the feature point according to the origin coordinate of the spatial coordinate system and the third vector.

15. The camera equipment according to claim 10, wherein the processor is configured to:

obtain initial feature points within a preset area in an image;

obtain a depth value of each initial feature point; and determine the depth value of the feature point in the image according to the depth value of each initial feature point within the preset area.

16. A non-transitory computer-readable storage medium having stored therein an instruction that, when executed by a processor of camera equipment, enables the camera equipment to perform a method for drawing a spatial map, wherein the method comprises:

determining a depth value of a feature point in an image captured by the camera equipment in a current position, the depth value being a depth value in a relative coordinate system established with the current position of the camera equipment as a coordinate origin;

determining a relative position coordinate of the feature point in the relative coordinate system based on the depth value;

determining a spatial position coordinate of the feature point in a spatial coordinate system based on the relative position coordinate, the spatial coordinate system being a spatial coordinate system established with a preset position of the camera equipment as a coordinate origin; and drawing the spatial map according to the spatial position coordinate of the feature point and a pixel value of the image captured by the camera equipment, based on the spatial coordinate system, wherein determining the spatial position coordinate of the feature point in the spatial coordinate system based on the relative position coordinate comprising:

obtaining the spatial position coordinate of the current position of the camera equipment in the spatial coordinate system; and determining the spatial position coordinate of the feature point in the spatial coordinate system according to the spatial position coordinate of the current position of the camera equipment and the relative position coordinate of the feature point; and wherein determining the spatial position coordinate of the feature point in the spatial coordinate system according to the spatial position coordinate of the current position of the camera equipment and the relative position coordinate of the feature point comprising:

determining a first vector between the origin in the spatial coordinate system and the current position of the camera equipment according to the spatial position coordinate of the current position of the camera equipment and an origin coordinate in the spatial coordinate system;

determining a second vector between the current position of the camera equipment and the feature point in the spatial coordinate system according to the relative position coordinate of the feature point; and determining the spatial position coordinate of the feature point according to the first vector and the second vector.

* * * * *